May 19, 1959  H. ODEN  2,887,536
CIRCUIT ARRANGEMENT FOR TIME-ZONE METERS
Filed March 19, 1953

INVENTOR
HOECKLEY ODEN

BY
ATTORNEY

United States Patent Office 2,887,536
Patented May 19, 1959

2,887,536
CIRCUIT ARRANGEMENT FOR TIME-ZONE METERS

Hoeckley Oden, Stuttgart-Stammheim, Germany, assignor to International Standard Electric Corporation, New York, N.Y., a corporation of Delaware Application March 19, 1953, Serial No. 343,425

Claims priority, application Germany March 22, 1952

7 Claims. (Cl. 179—7.1)

The present invention relates to a circuit arrangement which can be used in connection with all types of time-zone meters and which provides the possibility of seizing priority connections in automatic telephone systems and in automatic teletypewriter installations in view to the respective tariff rates, whereas the time-zone meter merely indicates the charges for an established connection in respect to the length of conversation and the distance.

The term "priority connections," as used in this specification may be defined as connections which generally enjoy preference in comparison with the usual connections, in one way or another. Thus for instance, one can automatically charge such connections with a special tariff rate, at which the destination is attained via a by-path or via special transmission lines of higher fee restrictions, or via lines and exchange systems which are only accessible at a special tariff rate, or also such connections which are established during unfavourable hours (rush hours).

Hence the invention is based on the problem of charging a multiple of the normal tariff rate in the presence of special conditions. According to the invention this is achieved in that the current impulses, which are delivered by the pulse contact of the time-zone meter, are temporarily registered once, or more than once, in such a manner that two or more counting pulses are applied to the subscriber's register at each making of the pulse contact, with a different time delay.

The employment of the measure according to the present invention allows the classification of the connections established in the automatic dialing and the co-ordination of them into groups of different fee restrictions and the registry of the corresponding charging of tariff rates thereby, so that the number of registered units is variable or is automatically changed according to the fee restriction of the established connection.

Figure 1:
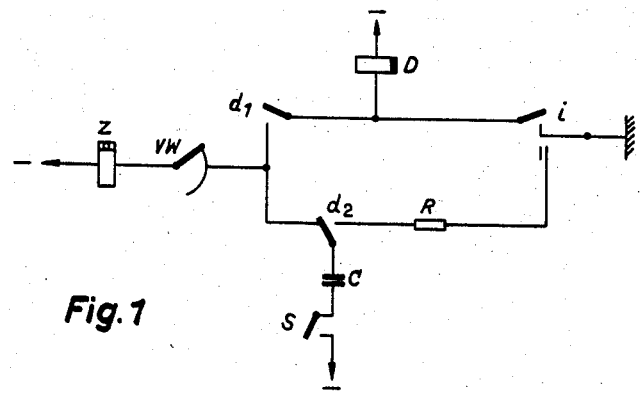
Figure 2:
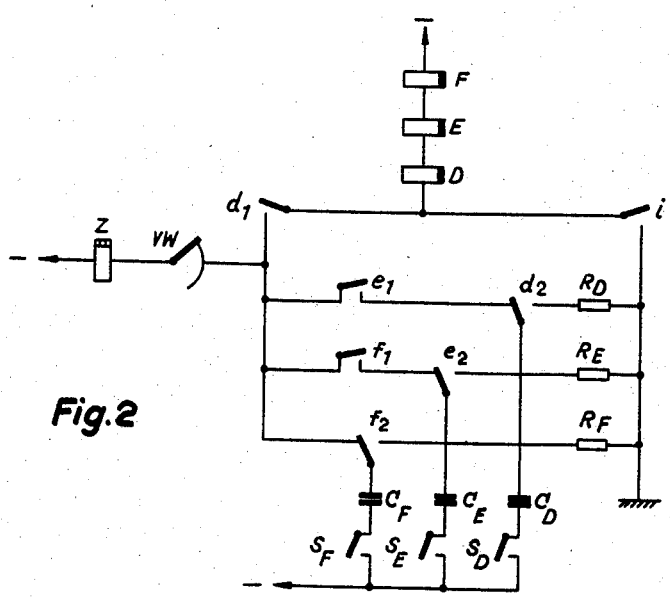

A more thorough understanding of the invention may be had from the following detailed description and the accompanying drawing in which:

Fig. 1 is a schematic representation of a first embodiment of my invention showing the mode of operation of a single additional tariff unit meter operating device; and Fig. 2 is a schematic representation of a modified form of the invention utilizing a plurality of additional tariff unit meter operating devices.

An exemplified embodiment of the invention is represented in Fig. 1 of the accompanying drawing. At the making of the pulse contact $i$ of the time-zone meter, relay D will be energized and contact $d_1$ operated, which transfers a current impulse via the preselector stage VW on to the meter Z. By the closure of $d_2$ front the condenser C is charged at the same time via the resistance R, provided that the "Special Tariff" switch S is in a closed condition. After the drop of contact $i$ which, like in this case, may also effect an interruption of the charging circuit for C, relay D is released with a certain delay, thereby opening the contact $d_1$ and making the contact $d_2$ back. Therewith, and owing to the discharge of condenser C, another current impulse is applied to the meter Z.

This circuit arrangement, as shown in Fig. 1, represents a specially simple and economical embodiment of the inventive principle, largely justifying the present purpose. On the other hand it exhibits only one single registering and accordingly only permits a doubling of the basic tariff for a connection established with priority, because each closing of the pulse contact $i$ effects the delivery of two current pulses to the meter Z. The doubling is effected at the closing of switch S.

As may easily be seen from Fig. 2, however, this circuit arrangement can be equipped in a corresponding manner with several registers. The exemplified circuit arrangement as shown in Fig. 2, exhibits a triple registration scheme, so that the basic tariff which is to be paid for an established connection, can be doubled, trebled or quadrupled at will, viz. according to the degree of their fee restriction. The function corresponds to the circuit arrangement of Fig. 1.

When closing the pulse contact $i$, relays D, E and F, which of course can also be selectively shunted by by-pass connections not shown, are energized and $d_1$ will be closed, so that a direct pulse is applied to the meter Z. At the same time, by the closure of the contacts $d_2$, $e_2$ and $f_2$, the condensers $C_D$, $D_E$ and $C_F$ are connected to potential and are charged via the resistances $R_D$, $R_E$ and $R_F$, respectively, corresponding to the closure of switches $S_D$, $S_E$ and $S_F$, respectively. The relays D, E and F are designed as slow-releasing relays exhibiting different releasing times. Contact $d_1$ is associated with the relay having the shortest releasing time.

Consonant with the delay time of relay D and a certain time after the lifting of contact $i$ relay D drops off, contact $d_1$ opens, contact $d_2$ is moved and the condenser $C_D$ discharges over the made contact $e_1$ via the pre-selector VW and the subscriber's register, by means of which a counting or metering is effected. Thereupon relay E drops off due to its delay time characteristic, causing a corresponding discharge of the condenser $C_E$, and finally relay F drops off, thereby causing its associated condenser $C_F$ to discharge into the meter Z to actuate same.

In order to prevent the re-charging of a discharged condenser by a parallel-connected charged condenser, isolating contacts $e_1$ and $f_1$ are provided. Thus, after condenser $C_D$ has discharged into the meter Z, the subsequent release of relay E will cause contact $e_1$ to open thereby isolating condenser $C_D$ from receiving a part of the stored charge in condenser $C_E$.

Taking the circuit arrangement according to Fig. 2 as a base, the charging of tariff rates for an established connection, can be carried out, for instance, as follows:—

If the subscriber does not take advantage of any special preferences, then the switches $S_D$, $S_E$ and $S_F$ remain opened and a single tariff rate is charged, due to the fact that the associated condensers $C_D$, $C_E$ and $C_F$ cannot become charged, the open switches $S_D$, $S_E$ and $S_F$ maintaining their respective charging paths open now as before. When taking advantage of a priority, which calls for the extra tariff, for instance, the establishment of a connection during rush hours, then switch $S_D$ will be closed and the basic tariff will be doubled. When making use of another advantage, such as the use of special lines, then another switch, viz. $S_E$, will be closed and the basic tariff will be trebled. Finally, the use of a third priority, such as the employment of a highly qualified line section, micro-wave section, or the like, effects the additional closing of the third switch and, therewith, a quadruplication of the basic tariff rate.

Hence the use of any priority, effects a multiple application of the single basic tariff rate. The actuation of the contacts $S_D$, $S_E$, and $S_F$ is carried out automatically, for instance, by locating certain decades of the group selector. Also the subscribers of one exchange area can be charged uniformly during the rush hours with a single special tariff (double basic tariff rate), by closing all switches $S_D$.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A meter arrangement for registering a first tariff unit and for selectively registering an additional tariff unit comprising a source of registering potential, a registering device for registering said units, switch means for connecting said source to said device to operate same thereby to register a first tariff unit thereon, capacitative potential storage means and means for selectively connecting said storage means first to said source and then to said register device to re-operate same under control of said switch means, said connecting means including time delay means for connecting said storage means to said device a predetermined time after disconnection by said switch means of said device from said source thereby to register said additional tariff unit thereon.

2. A meter arrangement as claimed in claim 1, wherein said selective connecting means comprises a time delay relay having two contact sets, one of said sets disposed in the path between said switch means and said registering device, the other of said sets adapted to alternately connect said storage means to said source and said registering device.

3. A meter arrangement as claimed in claim 1, wherein said selective connecting means further comprises a switch element disposed in the path between said storage means and said source, whereby said storage means may selectively be rendered inoperative.

4. A meter arrangement for registering a first tariff unit and for selectively registering a plurality of additional tariff units comprising a source of registering potential, a registering device for registering said units, switch means for connecting said source to said device to register a first tariff unit thereon, a plurality of capacitative potential storage means, each adapted to store a potential indicative of a different one of said additional tariff units, means for selectively connecting each of said storage means to said source and then to said register device seriatim to reoperate same under control of said switch means, said selective connecting means including time-delay means for selectively connecting said storage means to said device at predetermined times after disconnection by said switch means of said device from said source, thereby to register said additional tariff units thereon.

5. A meter arrangement as claimed in claim 4, wherein said storage means comprises a plurality of capacitors.

6. A meter arrangement as claimed in claim 4, wherein said selective connecting means comprises a plurality of time-delay relays, each having a different release-time characteristic, and corresponding in number with said storage means, the first of said relays having the shortest release-time characteristic and having two sets of contacts, the first set serially disposed between said switch means and said registering device, to control application of said first tariff unit thereto and its other set, disposed between one of said storage means and said registering device, another of said relays having two sets of contacts, a first set of which is disposed between the first set of contacts of said first relay and said registering device, and having its other set disposed between another of said storage means and said registering device.

7. A meter arrangement as claimed in claim 6, wherein said selective connecting means further comprises a plurality of switch elements, each disposed in the path of a different one of said storage means and said source whereby said storage means may selectively be rendered inoperative.

References Cited in the file of this patent

UNITED STATES PATENTS

| | | |
|---|---|---|
| 1,904,904 | Tharp et al. | Apr. 18, 1933 |
| 1,962,619 | Rumpf | June 12, 1934 |
| 2,073,756 | Osten-Sacken | Mar. 16, 1937 |
| 2,225,386 | Hebel | Dec. 17, 1940 |
| 2,546,605 | Lomax | Mar. 27, 1951 |